United States Patent [19]

Cantello et al.

[11] Patent Number: 4,683,504

[45] Date of Patent: Jul. 28, 1987

[54] APPARATUS FOR RECORDING AND READING BINARY INFORMATION ON A MAGNETIC DISC

[75] Inventors: Giuseppe Cantello, S. Giusto C.SE; Severino Concari, Ivrea, both of Italy

[73] Assignee: Ing. C. Olivetti & C., S.p.A., Ivrea, Italy

[21] Appl. No.: 816,796

[22] Filed: Jan. 7, 1986

[30] Foreign Application Priority Data

Feb. 21, 1985 [IT] Italy .............................. 67177 A/85

[51] Int. Cl.$^4$ ................................................ G11B 5/55
[52] U.S. Cl. ..................................................... 360/78
[58] Field of Search ............................. 360/75, 77, 78

[56] References Cited

U.S. PATENT DOCUMENTS 4,390,912  6/1983  Hertrich et al. ...................... 360/78
4,482,851  11/1984  Cantello ............................... 318/696

FOREIGN PATENT DOCUMENTS 55-88596  7/1980  Japan .................................. 318/696
58-164062  9/1983  Japan .................................. 360/97
59-104761  6/1984  Japan .................................. 360/99

OTHER PUBLICATIONS

IBM Technical Disclosure Bulletin, vol. 22, No. 8A, Jan. 1980, pp. 3127–3130, Recording Position Signals on Record Disks, Brock et al.

Primary Examiner—George G. Stellar
Attorney, Agent, or Firm—Banner, Birch, McKie & Beckett

[57] ABSTRACT

The apparatus is for recording and reading binary information on a magnetic disc (14) of rigid type, with a plurality of concentric recording tracks. Each track comprises a useful zone for storing binary information and a function zone in which information which is used for correct positioning of the head with respect to the central axis of the track is pre-recorded. Moreover, in the function zone of a predetermined track, information identifying this track as a reference track is also pre-recorded. A stepping motor (22) is adapted to position the magnetic recording and reading heads with respect to the tracks of the disc and is driven by a circuit which comprises a voltage source (51) and a voltage boosting circuit (53) which supplies the stepping motor (22) with a voltage (PA) higher than that (PW) supplied by the voltage source (51) during the presence of a command signal (RC) which is emitted by a control unit (15) during the time required to shift the heads from an existing position to a new position.

7 Claims, 6 Drawing Figures

APPARATUS FOR RECORDING AND READING BINARY INFORMATION ON A MAGNETIC DISC

BACKGROUND OF THE INVENTION

1. Field of the Invention

The present invention relates to an apparatus for recording and reading binary information on a magnetic disc having a plurality of concentric recording tracks, means for rotating the magnetic disc, at least one magnetic head for recording and reading information on magnetic head radially with respect to the disc to position it on a selected recording track, and a voltage source for supplying the stepping motor.

A first object of the present invention is to increase the dynamic torque of the stepping motor so as to obtain a reduction in the time necessary for positioning the magnetic head with respect to the selected track, and consequently a reduction in the time of access to the recorded information.

2. Description of the prior art

An apparatus is known in which a voltage multiplier is interposed between the voltage source and the stepping motor and is synchronized with the timing pulses which control the phases of the motor itself, in order to obtain at the beginning of each energization of the motor windings an energizing voltage which is a multiple of that supplied by the voltage source. This apparatus, however, has the drawback of obtaining increments of the energizing voltage which are not constant, but only pulsed and linked to the frequency of the command pulses of the phases of the motor.

SUMMARY OF THE INVENTION

In order to overcome such disadvantages, the apparatus according to the invention comprises a voltage boosting circuit interposed between the voltage source and the stepping motor, and means for providing an enabling signal such as to activate the voltage boosting circuit at the beginning of each shifting of the magnetic head towards a selected recording track and keep the voltage boosting circuit activated until such time as the magnetic head has reached the selected track.

A second object of the present invention is to produce on the disc an electronic absolute-position indicator which is able to give the magnetic head a radial reference for correct positioning on the recording tracks of the disc.

In accordance with this second object, the invention provides an apparatus comprising a maganetic head for recording and reading binary information on a magnetic disc provided with a plurality of concentric recording tracks, each having a useful zone for recording the binary information and function zone in which are prerecorded two blocks of information adapted to cause to be generated electric signals indicative of the positioning of the head. The apparatus comprises a control unit including timing means for defining two timing intervals during which the blocks of information of the function zone respectively are read for controlling a head motor to position the head accurately relative to a selected track. The timing means defines a further timing interval for reading a third block of information recorded in the function zone of one only of the tracks so as to identify that track as a reference track. Moreover, the first and second information blocks of the magnetic disc occupy part only of the angular extent of the function zones and, within the spare part of the function zones of one only of the tracks, the disc has a third information block recorded therein to identify that track as a reference track.

DESCRIPTION OF THE DRAWING

The invention will be described in more detail, by way of example and with reference to the accompanying drawings, in which.

DESCRIPTION OF THE PREFERRED EMBODIMENTS

Figure 1:
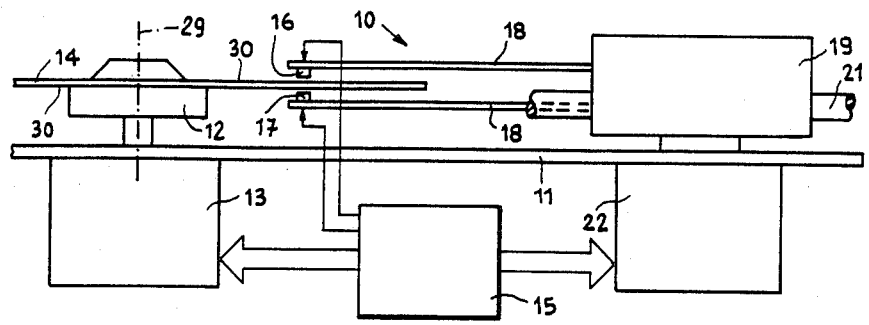
FIG. 1 is a partial side view of an apparatus embodying the invention.

Referring to FIG. 1, an apparatus 10 comprises a base plate 11 on which there is rotatably mounted a spindle 12 connected to an electric motor 13 and adapted to rotate at constant angular speed, at least one magnetic disc 14 which may be, for example, of rigid type. Normally, in accordance with a very widespread standard, the disc 14 is caused to rotate at a speed of 3600 revolutions per minute, with a tolerance of $\pm 1\%$, so that each revolution is carried out in a time of between 16.835 usec and 16.501 usec.

Figure 4:
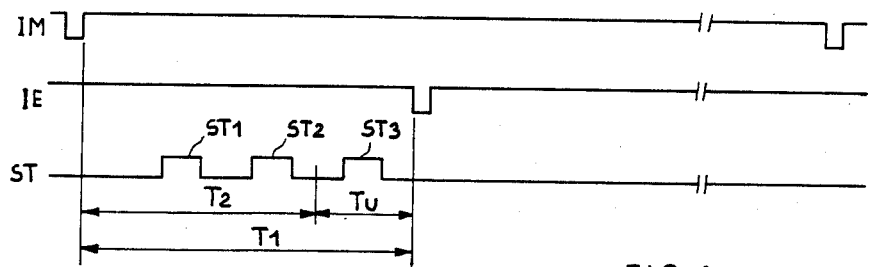
FIG. 4 is a diagram representing the course of some electric signals of the apparatus.

In order to take account of these possible differences, an electric index or interface signal IE (FIG. 4) adapted to enable the recording and reading of the binary information on the disc 14 is generated by a control unit 15 (FIG. 1) after a certain time $T_1$ from a mechanical index signal IM (FIG. 4) generated by the rotation of the motor 13. In accordance with a characteristic feature of the invention, the motor 13 and the disc 14 are caused to rotate at a speed of 3573 revolutions per minute, with a tolerance of $\pm 0.1\%$. In this way, keeping within the tolerance of the standard, each revolution is carried out in a time of between 16.811 usec and 16.773 usec.

Within the limits of the time $T_1$ between the signals IM and IE, there is thus created a "useful time" $T_u$, which is utilized in a manner which will be explained later on.

Figure 2:
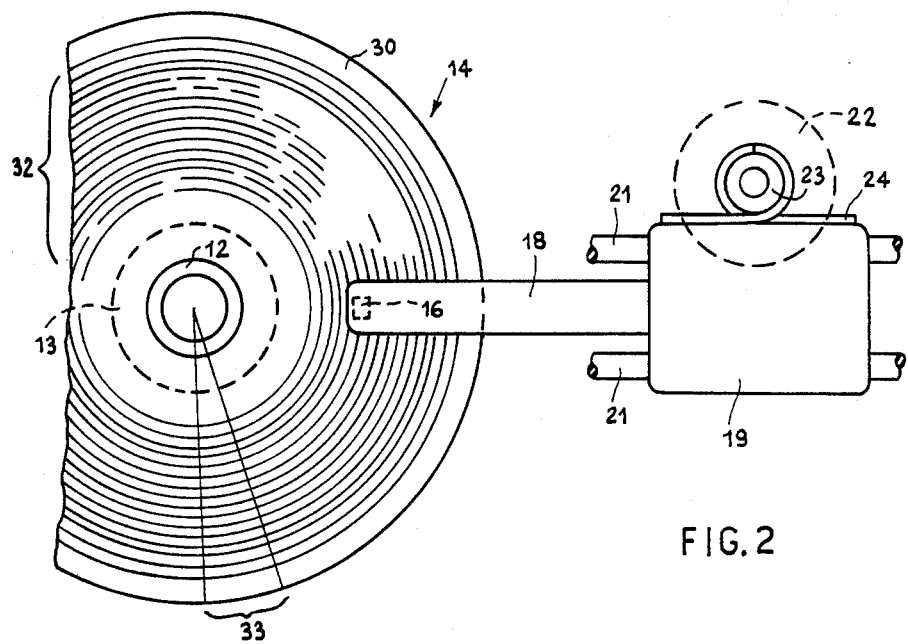
FIG. 2 is a plan view of the apparatus of FIG. 1.

Two magnetic heads 16 and 17 are mounted at the ends of two arms 18 of a carriage 19 which is slidable radially with respect to the disc 14 by means of guides 21 (FIGS. 1 and 2).

An electric motor 22 of the stepping type is fixed to the base plate 11 and is adapted to command the shifting of the carriage 19 and the heads 16 and 17 through the medium of a hub 23 and a pair of flexible strips 24 of known type, for example of the type described in our published European patent application EP No. 0 052 477.

Each magnetizable surface 30 of each disc 14 adapated to be recorded and/or read by the apparatus 10 according to the invention is subdivided into a plurality of tracks 32 concentric with the axis of rotation 29 of the disc 14.

Figure 3:
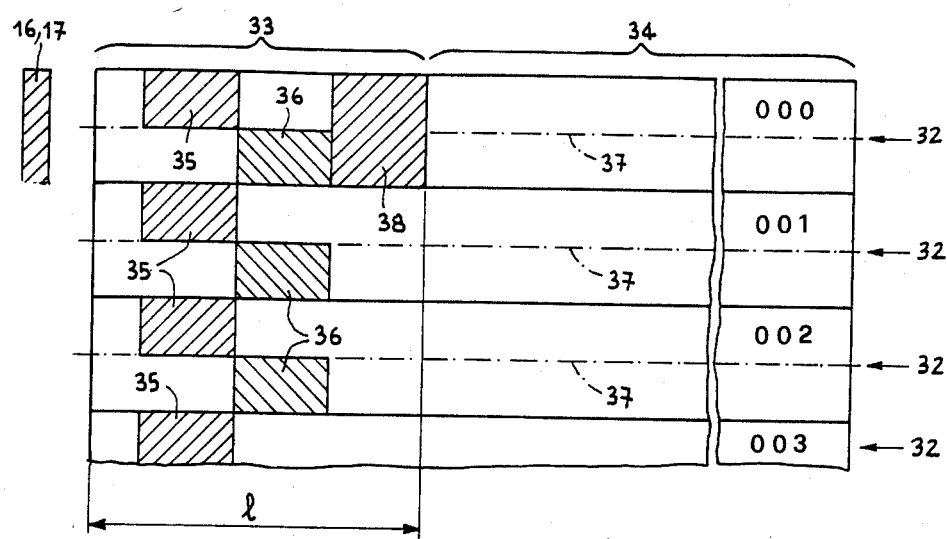
FIG. 3 is a diagrammatic representation of a detail of a magnetic disc handled by the apparatus.

The recording tracks 32, which in FIG. 3 are shown developed linearly, instead of on a circumference as they are in reality (FIG. 2), comprise a function zone 33 and a useful zone 34 in which binary information is adapted to be recorded.

The function zone 33 of each track 32 bears prerecorded servo-information subdivided into two blocks 35 and 36 arranged one following the other, but on opposite sides with respect to the central axes 37 of the recording tracks 32. The servo-information contained in the blocks 35 and 36 is adapted to be read by the magnetic head 16 or 17 to generate, in known manner, electric signals indicative of the positioning, whether correct or wrong, of the said head 16 or 17 with respect to the central axis 37 of the selected recording track 32. The length 1 of each zone 33 varies according to the radial position of the corresponding track 32 on the disc 14, but is in any case such as to make it possible for each function zone 33 to be read by the magnetic heads 16 and 17 always in the time $T_1$ which elapses between the mechanical index IM and the electric index IE. More particularly, the two blocks 35 and 36 are read in time $T_2$ (FIG. 4) less than the time $T_1$, in correspondence with the first two pulses ST1 and ST2 of a timing signal ST generated by the control unit 15.

In accordance with a characteristic feature of the invention, each magnetic disc 14 bears pre-recorded on a predetermined reference track 000 (FIG. 3) of the recording tracks 32, between the servo-information blocks 35 and 36 and the useful zone 34, a third block 38 of servo-information which is not present in the other tracks 32 and is adapted to be read by the magnetic head 16 and 17 during the time $T_u$ (FIG. 4) included in the time $T_1$, in correspondance with a third pulse ST3 of the timing signal ST. In this way, owing to the choice of the speed with which the magnetic disc 14 is caused to rotate and without waste of magnetic surface intended for binary information, an electronic position indicator is produced which, recognized by the magnetic head 16 or 17, is able to determine when this is positioned in the reference track 000.

Figure 5:
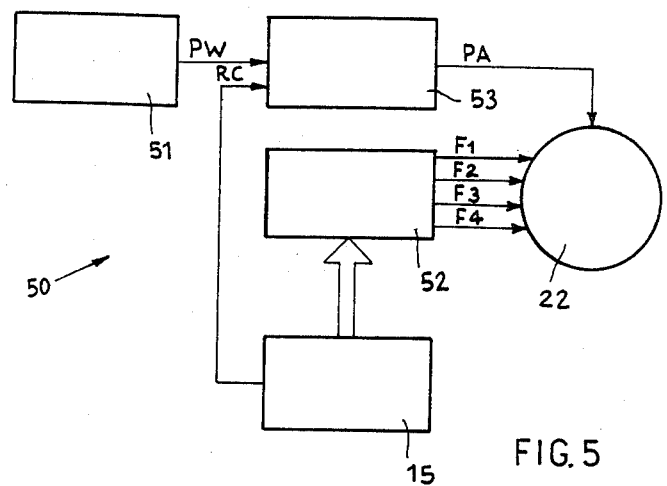
FIG. 5 is a block diagram of an electric circuit of the apparatus of FIG. 1.

The stepping motor 22 (FIGS. 1, 2 and 5), which control the shifting of the magnetic heads 16 and 17, is driven by a circuit 50 which comprises a supply 51 adapted to generate a d.c. voltage PW of predetermined constant value, for example 12 volts, and a translator 52 of known type which is connected to the control unit 15 and is adapted to generate a series of sequential signals F1, F2, F3 and F4 adapted to command the actual energization of the windings of the motor 22.

In accordance with a further characteristic feature of the present invention, the circuit 50 comprises a voltage boosting circuit 53 at whose inputs there arrive the d.c. voltage PW and a logical signal RC generated by the control unit 15, and at whose output there is generated a voltage PA of actual supply for the stepping motor 22.

Figure 6:
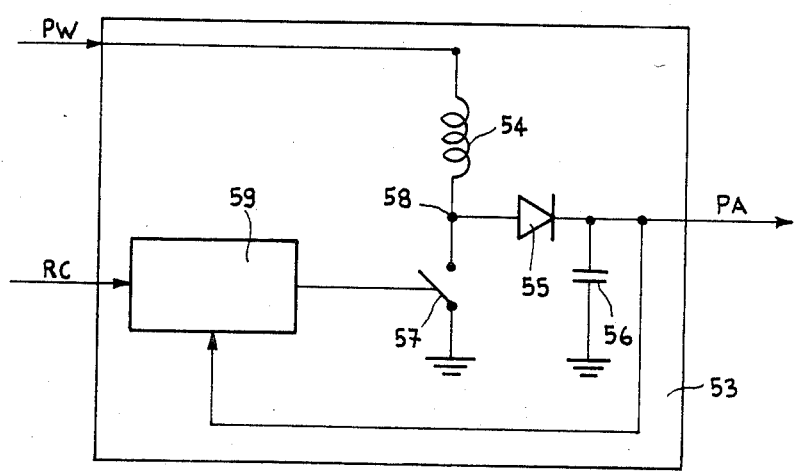
FIG. 6 is a diagram of electrical connections of a detail of the circuit of FIG. 5.

The voltage boosting circuit 53 (FIG. 6) comprises in turn an inductance coil 54, a diode 55 and a capacitor 56 connected in series, between the voltage PW and earth. A switch 57 is adapted to connect one end 58 of the inductance coil 54 to earth and is commanded by an adjustable pulse width modulator 59 (Regulating Pulse Width Modulator) of known type, for example of the type known commercially by the abbreviation SG 1524, of the company Silicon General, which operates at a frequency higher than 100 KHz.

The apparatus 10 hereinbefore described operates in the following manner:

To bring the magnetic heads 16 and 17 onto the reference track 000 (FIG. 3) or on to any other selected recording track 32, the stepping motor 22 is commanded by the control unit 15 to effect an angular movement of greater or lesser extent, to which there correspond one or more elementary steps.

At the beginning of each angular movement, the circuit 50 which controls the stepping motor 22 is adapted to produce, with the consent of the logical signal RD, a voltage PA higher than that supplied by the generator 51 and with availability of power which contributes to increasing the dynamic torque on the motor 22 itself, with a consequent reduction in the time of execution of the angular movement. The ratio between the voltage PA and the voltage PW is programmable by acting on the modulator 59 which controls the switch 57, and this ratio is not necessarily a whole multiple. More particularly, if T is the period of closing and opening of the switch 57, $T_1$ is the time of closing and $T_2$ is the time of opening, the ratio between the voltages PA and PW is equal to the ratio between the period T and the time $T_2$.

In a particular embodiment, the time $T_2$ has been chosen equal to one third of the period T in order to obtain a ratio of 3:1 between the voltage PA and the voltage PW.

The voltage boosting circuit 52 is self-oscillating with a synchronous frequency and does not have any relation with the driving frequency of the stepping motor 22. Moreover, the voltage boosting circuit 53 is activated by the signal RC only for the time necessary to effect the shifting of the heads 16 and 17, during which time neither recording nor reading is done, and on the other hand is deactivated during the operations of recording and reading, that is when the stepping motor 22 is stationary.

In this way, a considerable reduction in the time of access to the selected track 32 is obtained, without disturbing the magnetic heads during the stages of recording and reading.

We claim:

1. A magnetic disc comprising a plurality of concentric recording tracks, each consisting of a useful zone for recording binary information and a function zone within a predetermined sector of the disc, and means identifying a reference circumferential position on the disc, each function zone including first and second information blocks which are both circumferentially and radially displaced relative to each other and can be sensed at times (ST1, ST2) fixed relative to a time (IM) corresponding to the reference circumferential position for providing servo control information to a control unit which controls the position of a magnetic head relative to a selected track, wherein the first and second information blocks occupy part only of the angular extent of the function zones and, within the spare part of the function zones of one only of the tracks of the disc has a third information block recorded therein to identify that track as a reference track.

2. Apparatus for recording and reading binary information on a magnetic disc having a plurality of concentric recording tracks, comprising means for rotating the magnetic disc, at least one magnetic head for recording and reading information on the recording tracks, a stepping motor adapted to translate the magnetic head radially with respect to the disc to position it on a selected recording track, and a voltage source for supplying the stepping motor, a voltage boosting circuit interposed between the voltage source and the stepping motor, and means for providing an enabling signal (RC) such as to activate the voltage boosting circuit at the beginning of each shifting of the magnetic head towards a selected recording track and keep the voltage boosting circuit activated until such time as the magnetic head has reached the selected track, wherein the voltage source generates a d.c. voltage (PW) of constant value, and the voltage boosting circuit comprises an inductance coil, a diode and a capacitor connected in series between the d.c. voltage and earth, a switch being connected between the inductance coil and earth and a voltage (PA) of actual supply for the stepping motor being generated at an intermediated point between the diode and the capacitor.

3. Apparatus according to claim 2, wherein said switch is controlled by a pulse width modulator which is activated by the said enabling signal (RC).

4. Apparatus according to claim 3, wherein said the pulse width modulator is adjustable to vary the times of opening and closing of the switch.

5. Apparatus for recording and reading binary information on a magnetic disc provided with a plurality of concentric recording tracks, each having a useful zone for recording the binary information and a function zone in which are pre-recorded two blocks of information adapted to cause to be generated electric signals indicative of the positioning of the reading element with respect to the recording track, the apparatus comprising an electric motor for rotating the magnetic disc at a given angular speed, a magnetic head adapted to record and read the information on the recording tracks, a head motor for positioning the head relative to the tracks, means for sensing a datum rotational position of the disc, and a control unit including timing means for defining two timing intervals (ST1, ST2) during which the said two blocks of information respectively are read for controlling the head motor to position the head accurately relative to a selected track, and wherein the control unit including timing means defines a further timing interval (ST3) for reading a third block of information recorded in the function zone of one only of the tracks so as to identify that track as a reference track.

6. Apparatus according to claim 5, characterised in that the given angular speed is lower than a standardized nominal speed, being however within the tolerance associated with the standardized nominal speed.

7. Apparatus according to claim 6, wherein the standardised nominal speed is 3600/min ±1%, characterised in that the given angular speed is 3573/min ±0.1%.

* * * * *